US006766165B2

(12) United States Patent
Sharma et al.

(10) Patent No.: US 6,766,165 B2
(45) Date of Patent: Jul. 20, 2004

(54) METHOD AND SYSTEM FOR REMOTE AND LOCAL MOBILE NETWORK MANAGEMENT

(75) Inventors: Shallendra Sharma, Sunnyvale, CA (US); Hung Truong, San Jose, CA (US)

(73) Assignee: Nortel Networks Limited, St. Laurent (CA)

( * ) Notice: Subject to any disclaimer, the term of this patent is extended or adjusted under 35 U.S.C. 154(b) by 589 days.

(21) Appl. No.: 09/731,420

(22) Filed: Dec. 5, 2000

(65) Prior Publication Data

US 2002/0068559 A1 Jun. 6, 2002

(51) Int. Cl.[7] ................................................ H04Q 7/20
(52) U.S. Cl. .................... 455/423; 455/418; 455/67.11; 370/241; 370/245
(58) Field of Search ................................ 455/418, 419, 455/420, 423, 424, 425, 67.11, 67.12, 67.13, 67.14; 370/241, 242, 245, 254

(56) References Cited

U.S. PATENT DOCUMENTS

| 6,226,498 B1 | * | 5/2001 | Tschorn et al. | .......... 455/67.11 |
| 6,292,657 B1 | * | 9/2001 | Laursen et al. | ............. 455/411 |
| 6,434,364 B1 | * | 8/2002 | O'Riordain | .............. 455/67.11 |
| 6,594,470 B1 | * | 7/2003 | Barnes et al. | .............. 455/67.7 |

* cited by examiner

Primary Examiner—Marsha D. Banks-Harold
Assistant Examiner—Nghi H. Ly
(74) Attorney, Agent, or Firm—Pillsbury Winthrop LLP

(57) ABSTRACT

Systems and methods of providing mobile network management of assets on a network are presented. In accordance with the method, a network management server is provided to control a network asset on a network. The network asset is connected to the network management server via a connection path. A secure communication path is established between the network management server and a mobile wireless capable device. The network asset is managed via the secure communication path with the mobile wireless capable device. The network is administered via the secure communication path with the mobile wireless capable device.

25 Claims, 5 Drawing Sheets

METHOD AND SYSTEM FOR REMOTE AND LOCAL MOBILE NETWORK MANAGEMENT

TECHNICAL FIELD

The present invention relates to computer networking, and, more particularly, to secure mobile management of networked assets via wireless devices in networked environments.

BACKGROUND

A network manager such as a network administrator has responsibility for managing network assets such as network devices on a network such as a voice or a data communication network. Managing devices typically includes, for example, configuring the devices, and, once the network is configured, routine monitoring of the devices, reconfiguring the devices if desirable, and troubleshooting problems with the network and/or the devices if problems should arise. For routine monitoring as well as for more intensive troubleshooting, a network manager needs to examine information about the network device. This information allows the manager to solve network problems as well as to reconfigure the network for greater stability and improved performance. Examining information about a device is often accomplished at a management station physically remote from the network device. The management station may be a network management server that, for example, monitors performance of managed network devices using an application such as a Simple Network Management Protocol (SNMP) trap monitoring application such as a fault browser or an alarm browser. Other devices have a built-in web server that provides an http interface for management applications. When faults occur on network assets such as network devices, a network manager may connect to these devices from a World Wide Web browser, to configure and manage these devices. The network manager is still reliant, though, on the a main network management system to forward, correlate, and isolate the faults in order to point the manager to the correct device, which the manager can now reconfigure or monitor more closely. Even if the device had the capability to send the network manager the fault directly, which some devices have, it would not be possible to isolate the cause of the fault and effect of the fault on the total network, or the applicable sub network absent the aid of topology information that resides on the network management server. Furthermore, the network manager would not have accurate information focused on the network that the manager is currently in. Rather, the manager would be faced with a jumble of individual devices and links and large network topologies, which make it difficult for the network manager to comprehend the small sub network around the manager and to monitor faults just for this network. The information on what exactly is in the network around a network manager is so difficult to obtain and information is so hard to apply to the context of the subnetwork in particular and the larger network in general. Network devices with built-in Web application interfaces do not solve this problem in a practical way that aids a roaming mobile network manager.

Service providers or distributors sell equipment, such as telecommunication private branch exchanges (PBXs) or Internet data routers, to their customers and manage the equipment remotely from their central offices. The PBXs or Internet data routers are a critical part of the working business environment of the customer organization and often hold vital security information about, for example, the telephones and the users in the organization.

A distributor has many network technicians, with or without administrative privileges, who can log onto a network management server to monitor, access, and manage network devices, for example, through Web applications residing on the network management server. The network management server hosts the applications that manage the PBX switch, for example. Generally, the network management server is located on the customer's network and is remotely accessed from the distributor's central office hosting a central network management server, or directly access by network technicians having login privileges on the customer's network management server. A distributor might also remotely manage a customer's network that has a variety of optical, wireless, data, and voice network devices and media on it, for example.

Currently, network management occurs via fixed network management servers. In order to manage the network, a network manager has to operate a network management server client that is physically connected to the network management server and thus to the network. Typically, the network management server client runs on the network management server itself. A network manager, such as a network administrator, or a technician granted network management privileges by the administrator, typically examines the network from a desktop workstation, for example, a UNIX terminal or a PC. The desktop workstation is, in effect, tied to the desk of the manager.

A service provider might remotely manage a network, albeit with a workstation dial-up modem connection or similar connection. In remote network administration, for example in a wide-area network, the management client has to be physically on the network. In some cases, this is difficult to achieve and can present authentication and domain networking issues.

In large, multiple asset networks, if a roaming network technician, for example, goes to a portion of a network located in a building, there may be a variety of network assets in that network portion. Typically the network technician will typically not have an easy way to determine which asset is to be managed. The network technician in many cases must walk back to the network management server client, which may be running on a network management server and which may be physically located in another building, to learn more about the problem areas in that portion of the network. Network management servers are unable to present to the network technician a view of the very network that the technician is standing right in front of, or right in the middle of. The network technician must instead connect to the server, typically through a client, or, for example, possibly even walk back to the server, which can be located miles away from where the network and its assets of interest are present, in order to determine what assets exists in the network and how to monitor and manage the assets. Even in this instance the network technician typically needs to have extensive knowledge of this network and its assets in order to be able to focus on the very devices and other assets that are affecting a particular geographical location, such as a particular building in a large corporate campus. This information often lies buried under layers of complex network topologies that most often do not easily correlate to the actual physical layout of the network.

Even a laptop computer is limited in terms of full mobility by the required physical connection with the network.

Theoretically, an individual equipped with administrative permissions on the network and operating a laptop computer having a modem dial-up connection to the network management server can eventually drill down through complex device lists to either find a particular asset or identify the location of a particular asset. This nominal access to network equipment can be problematic and complicated, however, and is not a fully mobile solution since a physical connection to the network management server is typically required.

Conventional arrangements such as those described above limit the flexibility and mobility of a network manager such as an administrator or a technician to manage and troubleshoot problems on a network.

SUMMARY OF THE INVENTION

Systems and methods of providing mobile network management of assets on a network are presented. In accordance with an example of the method, a network management server is provided to control a network asset on a network. The network asset is connected to the network management server via a connection path. A secure communication path is established between the network management server and a mobile wireless capable device. The network asset is managed via the secure communication path with the mobile wireless capable device. The network is administered via the secure communication path with the mobile wireless capable device.

A mobile network management system is provided according to one aspect of the invention. The mobile network management system includes a network management server, a wireless transceiver, and a mobile wireless capable device. The network management server controls a network asset on a network. The network asset is connected to the network management server via a connection path. The wireless transceiver is coupled to the network management server. The mobile wireless capable device communicates with the network management server via the wireless transceiver to manage the network asset and to administer the network.

A mobile network management system is provided according to another aspect of the invention. The mobile network management system includes a network management server, a remote wireless transceiver, and a mobile wireless capable device. The network management server controls a network asset on a network. The network asset is connected to the network management server via a connection path. The remote wireless transceiver communicates with the network management server via an internet. The mobile wireless capable device communicates with the network management server via the remote wireless transceiver to manage the network asset and to administer the network.

BRIEF DESCRIPTION OF THE DRAWINGS

The foregoing and other features, aspects, and advantages will become more apparent from the following detailed description when read in conjunction with the following drawings, wherein.

DETAILED DESCRIPTION OF THE PRESENTLY PREFERRED EMBODIMENTS

Figure 1:
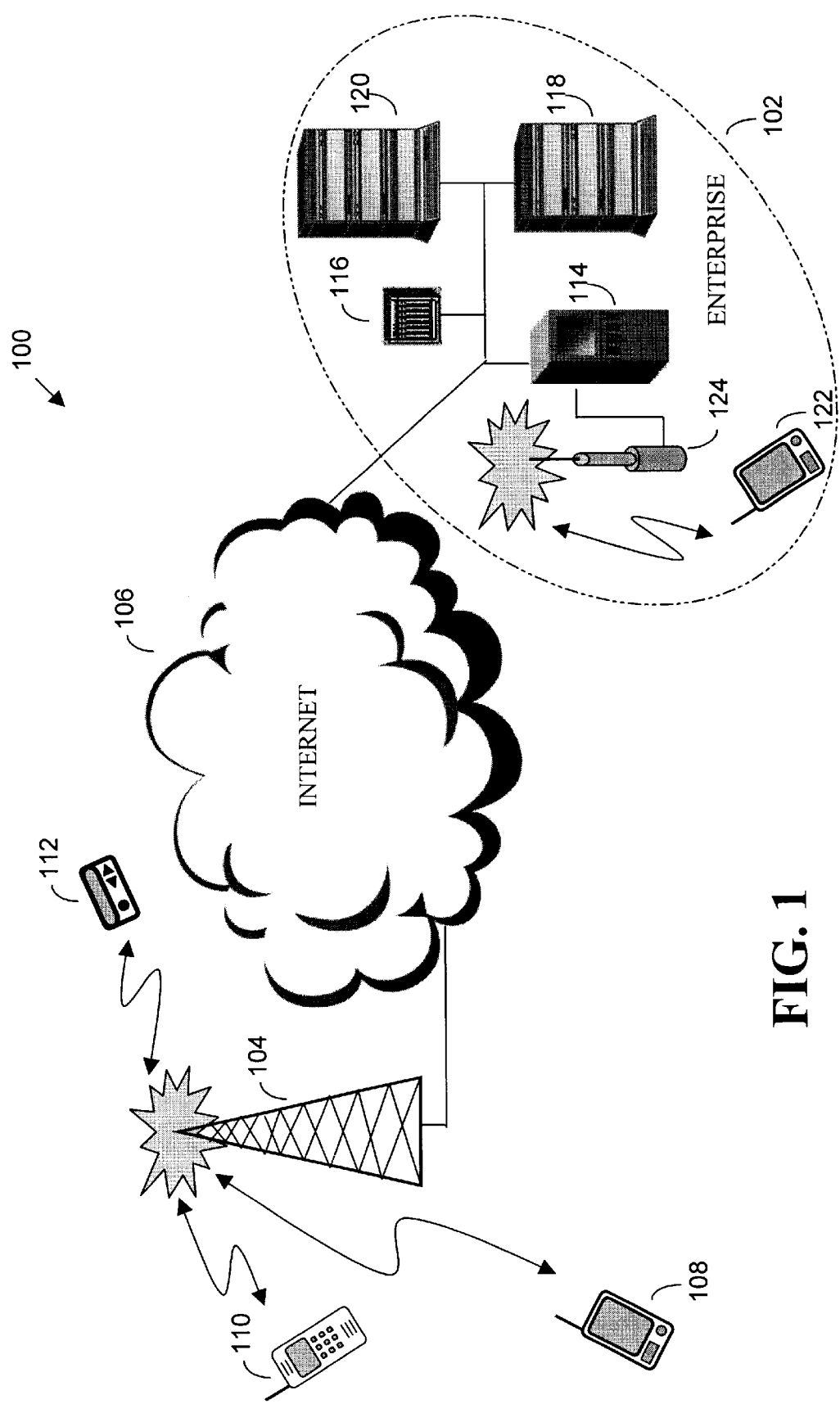
FIG. 1 is a diagram illustrating a high-level exemplary perspective of the structure of an exemplary distributed communications system according to a presently preferred embodiment.

A system is provided according to an aspect of the present invention that enables a network manager to monitor, in real-time, the status of the network through a mobile wireless capable device. Once an error condition is detected on a network, the system enables the network manager to remotely configure, manage, perform fault isolation, and correct the network asset or assets in question. The system is capable of extracting a network topology view relevant to the task at hand from the network management server for greater precision of fault isolation and for a real-time view of the network neighborhood. In addition, the system enables a network manager, operating remotely, for example, to form personal area network (PAN) views to efficiently manage networks, both ground-based and wireless, through a mobile wireless capable device communicating with a wireless capable network management server. The system provides the ability to remotely manage networks through mobile wireless capable devices.

The present invention provides methods and systems to propagate fault and real-time monitoring capability from a network management server to remote mobile wireless capable devices, such as personal digital assistants (PDAs), used by, for example, roaming technicians and network administrators. In addition, the invention provides methods for secure communication of configuration information between the network management server and the mobile wireless capable device and, in turn, real-time propagation of this information to the network assets or assets being managed.

The system includes a seamless information pipeline connecting management applications running on a mobile wireless capable device, such as a handheld PDA, to a network management server and managed network assets in real-time. The network management server securely connects to the management applications to transmit network events relevant to the configuration and topology of the network. The network management server also employs secure interfaces for receiving events, and real-time connection and configuration data, from the mobile wireless capable device.

The server presents network views and data specific to the network asset or assets of interest. A network administrator of the network management server may define multiple views of the same network defined on the basis of interest, security and activity. A roaming network technician logging onto the network management server through a mobile wireless capable device is presented the view of the network, including accessible devices and applications, in conformance with the security and administrative views set on the network management server. The system via the network management server presents to the mobile wireless capable device an extremely focused access view to aid in network management, including troubleshooting, as necessary. Network management applications on the network management server automatically communicate with the mobile wireless capable devices over a secure channel to enable a network manager such as a roaming technician to monitor and manage the network. The network views can be associated with the actual geographical location and the network topology around the location. In a preferred embodiment, distributed wireless transceivers attached to a distributed or centralized system of network management servers enable a network manager to get access to the views, subject to user privileges, without having to drill down from a top-level complex network topology.

Exemplary embodiments according to an aspect of the present invention provide network management functionality through mobile wireless capable devices. The functionality includes:

The ability to remotely connect and communicate with a network management server to view network topology and securely access network assets, including network connected devices.

The ability to perform remote configuration management of network assets, including initial configuration of assets, regular configuration of assets, and reconfiguration of assets in light of a network event.

The ability to perform remote monitoring of network status, remote network troubleshooting and fault isolation, and remote correction of isolated fault areas.

The ability to locally or remotely interface with a network management server via a wireless connection to gain access to a variety of unique wireless management applications for network and device configuration running on the network management server.

The ability to provide easy adaptability and compatibility to a variety of mobile wireless capable devices including devices such as pagers, cellular phones and PDAs.

For personal area network (PAN) applications, the ability to provide personalized and customizable network access and network topology views utilizing wireless capable network management applications.

The ability to provide a network manager at a mobile wireless capable device with specific permissions on the network consistent with a user privilege level and instructions from a network administrator.

The ability to provide real-time notification of network status and of network events of interests.

The ability to generate fault notifications, including notifications of serious and critical faults on the network.

The ability to send the fault notifications to mobile wireless capable devices, both remotely and locally networked with a network management server. This should take into account that the wireless compatible NMS knows where the network manager is and can route the fault appropriately over a LAN or a WAN link. At the same time, this allows faults to be sent to the network manager from devices in his neighborhood when he is there. Additionally or alternatively, only critical faults may be sent to the network manager when he is in another neighborhood or in a WAN environment (e.g. routed via a cellular provider).

The ability to receive the fault notifications, details of network events, and relevant topology views at the mobile wireless capable devices so that a network manager in a position of user privilege level-based authority over network management functions can immediately respond to the received notifications, details and views as applicable.

The ability to perform network management while roaming anywhere within the service range of the mobile network management system. This ability potentially provides network managers with increased flexibility in designing their schedules between home and the office, for example, while preserving and enhancing their ability to perform their network management tasks.

The present invention will now be described in detail with reference to the accompanying drawings, which are provided as illustrative examples of preferred embodiments of the present invention.

FIG. 1 is a diagram illustrating a high-level exemplary perspective of the structure of an exemplary distributed communications system 100 according to a presently preferred embodiment. The system 100 includes an enterprise 102 that connects to a wireless service provider 104 via an internet 106. The internet 106, may be, for example, the public Internet, or a public or private interconnected network, or a combination thereof, or a generic network. Mobile wireless capable devices 108, 110, 112 at remote locations accessible to the wireless service provider 104 communicate with a network management server (NMS) 114 located at the enterprise 102 site, preferably over a secure connection, via the wireless service provider 104 and the internet 106. The mobile wireless capable devices 108, 110, 112 form a portion of a wide area network (WAN) and the connection via the wireless service provider constitutes a WAN link. The mobile wireless capable devices 108, 110, 112 include a personal digital assistant (PDA) 108, a wireless application protocol (WAP) capable cellular phone 110, and a pager 112. The PDA 108 can be, for example, a PALM series handheld device from Palm of Santa Clara, Calif., although any personal digital assistant may be used as suitable. The system 100 is not limited to these specific devices, however, and any of a variety of suitable mobile wireless capable devices may be used as suitable. The enterprise 102 includes a network that further includes a series of network assets 116, 118, 120. The network assets 116, 118, 120 include a hub 116 and private branch exchanges (PBXs) 118, 120. The system 100 is not limited to these specific devices, however, and any of a wide variety of suitable network assets can be managed by the system 100 and the embodiments described herein and may be used as suitable. The hub 116 of FIG. 1 can be, for example, a Bay Stack Hub or a Passport Switch from Nortel Networks of Ottawa, Canada, although any network device may be used as suitable. The PBXs 118, 120 of FIG. 1 can be, for example, MERIDIAN 1 systems from Nortel Networks, although any exchanges may be used as suitable. In a preferred embodiment, the NMS 114 is a central NMS for the network at the enterprise 102. The system 100 is not limited to having a central NMS located at the enterprise 102 site. For example, in other embodiments, the central NMS may be located at a remote location from the enterprise 102 site, for example at a service provider site at which a service provider has management responsibility and privileges for at least a portion of the enterprise 102 network. In this instance, the NMS 114 may represent, for example, a local NMS server that provides management capability for a portion of the enterprise 102 network. The local NMS server may be one of a distributed system of NMS servers as suitable. A mobile wireless capable device 122 at the enterprise 102 site communicates with the NMS 114 via a wireless transceiver 124 coupled to the NMS 114. The wireless transceiver 124 may itself communicate with, for example, a wireless personal area network (PAN) at the enterprise 102 site. The mobile wireless capable device 122 of FIG. 1 is illustrated as a PDA 122, although any mobile wireless capable device may be used as suitable. The mobile wireless capable device 122 communicates with the NMS 114 and is preferably provided with management capability over assets on the enterprise 102 network. These assets may include, for example, the network assets 116, 118, 120, network assets in a PAN, for example a wireless PAN, or any combination of network assets as suitable.

Preferably, the wireless transceiver 124 is capable of transmitting and receiving communication signals at a variety of frequencies, including RF signals, Infrared signals, other signals as suitable, and combinations thereof. The type of signals transmitted or received will depend on the technology most suitable for deployment in a particular application. The signals carry the data for the system 100.

Preferably, a network manager deploys a distributed system of network management servers, such as the NMS 114 to configure, manage, and monitor the enterprise 102 network. For example, the NMS 114 may be an OPTIVITY Network Management System, from Nortel Networks of Ottawa, Canada to manage network assets such as telecom switches as well as assets capable of supporting Simple Network Management Protocol (SNMP) or other management protocol or even a telnet or an http management interface. Other possible management servers from Nortel Networks include the OPTIVITY Network Configuration System and the OPTIVITY Telephony Manager Server, although any suitable network management server may be used. Preferably, the distributed system of network management servers, including the NMS 114, is responsible for collecting real-time information of the network assets being monitored and managed.

Figure 2:
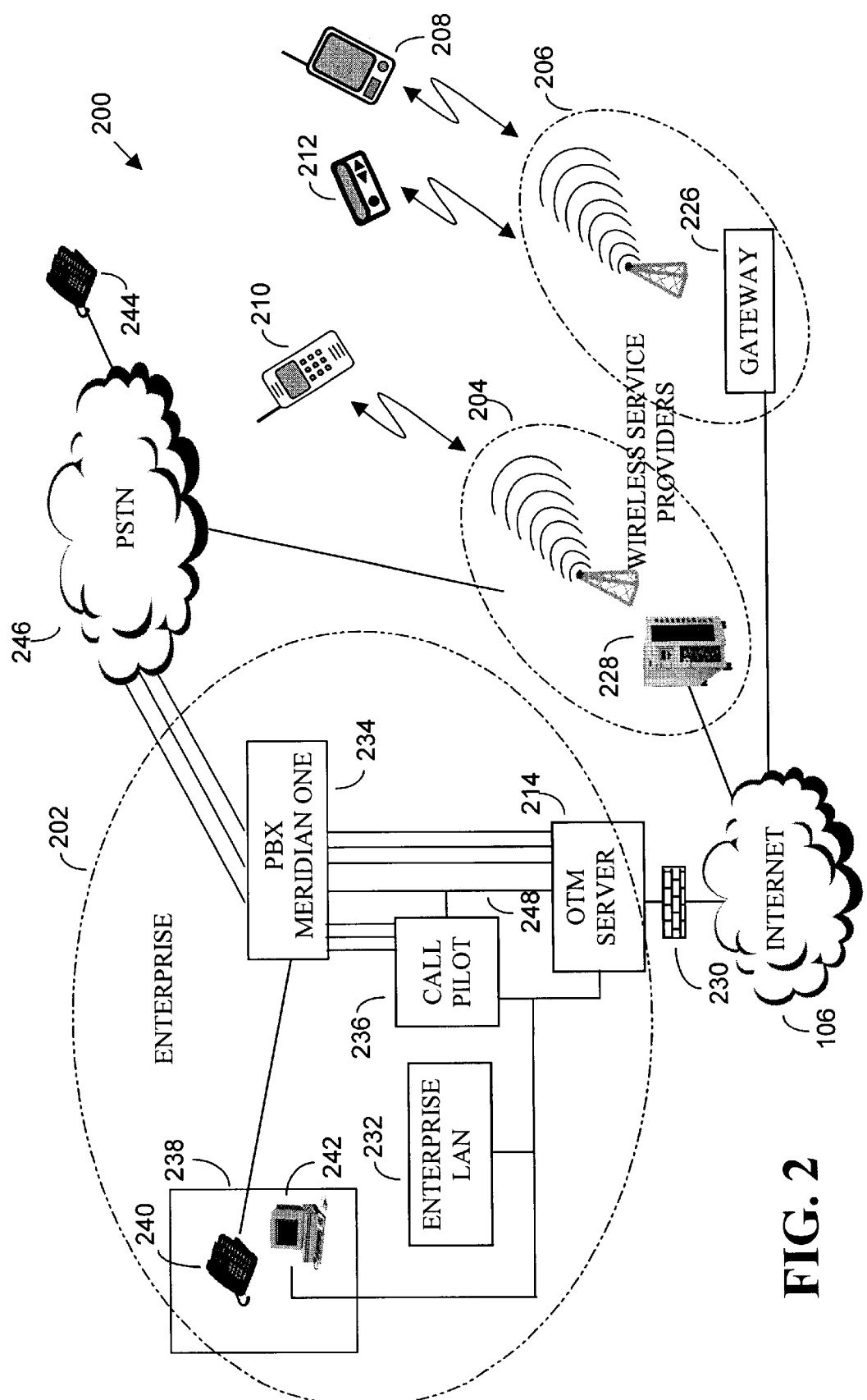
FIG. 2 is a diagram illustrating an exemplary system in accordance with the exemplary distributed communications system of FIG. 1.

Referring now to FIG. 2, it is a diagram illustrating an exemplary system 200 in accordance with the exemplary distributed communications system 100 of FIG. 1. The system 200 includes an enterprise 202 that connects to wireless service providers 204, 206 via the internet 106. A firewall 230 of the enterprise 202 provides protection for the enterprise 202 network from unauthorized attempts to connect to the enterprise from the internet 106. Mobile wireless capable devices 208, 212 at remote locations accessible to the wireless service provider 206 communicate with a network management server (NMS) 214 located at the enterprise 202 site, preferably over a secure connection, via the wireless service provider 206 and the internet 106. In FIG. 2, the NMS 214 is, for example, illustrated as an OPTIVITY Telephony Manager (OTM) server 214, from Nortel Networks to manage network assets such as telecom switches as well as assets capable of supporting a telnet or an http management interface. Other possible management servers from Nortel Networks include the OPTIVITY Network Management System and the OPTIVITY Network Configuration System, although any suitable network management server may be used. A gateway 226 located at the wireless service provider 206 site connects to the internet 106. A mobile wireless capable device 210 at another remote location accessible to the wireless service provider 204 communicates with the NMS 214 located at the enterprise 202 site, preferably over a secure connection, via the wireless service provider 204 and the internet 106. A WAP capable gateway 228 located at the wireless service provider 204 site connects to the internet 106. The wireless service provider 204 supports, for example, Code Division Multiple Access (CDMA) digital spread spectrum cellular phone service. CDMA is well known to those skilled in the arts of communication signaling techniques and wireless networking. The mobile wireless capable devices 208, 210, 212 form a portion of a wide area network (WAN) and the connections via the wireless service providers 204, 206 constitute WAN links.

The mobile wireless capable devices 208, 210, 212 include a PDA 208, a WAP capable cellular phone 210, and a pager 212. The PDA 208 can be, for example, a PALM series handheld device from Palm of Santa Clara, Calif., although any personal digital assistant may be used as suitable.

The NMS 214 located at the enterprise 202 site, for example, the OTM server 214, provides the capability to configure, manage, and monitor the enterprise 202 network. The enterprise 202 network includes an enterprise local area network (LAN) 232, a private branch exchange (PBX) 234, a Call Pilot 236, and an exemplary user station 238 communicating with the enterprise LAN 232 and the PBX 234. The exemplary user station 238 can include several network assets, including a telephone 240 and a computer 242 as shown in FIG. 2. A voice call control LAN (ELAN) 248 connects the PBX 234, the Call Pilot 236 and the OTM server 214. In FIG. 2, the PBX 234 is, for example, illustrated as a MERIDIAN ONE system from Nortel Networks. In a preferred embodiment, the enterprise data LAN 232 is a corporate data LAN that includes storage and capability for corporate directories, intranet news, electronic mail databases, and other databases. The enterprise 202 network system 200 is not limited to these specific devices 232, 234, 236, 238, 240, 242, 248 and the examples of these devices, however, and any of a wide variety of suitable network assets can be managed by the system 200 and the embodiments described herein and may be used as suitable. The PBX 234 receives and switches telephone calls and other traffic received from entities such as a telephone 244 via the public switched telephone network (PSTN) 246 into the enterprise 202 network.

Figure 3:
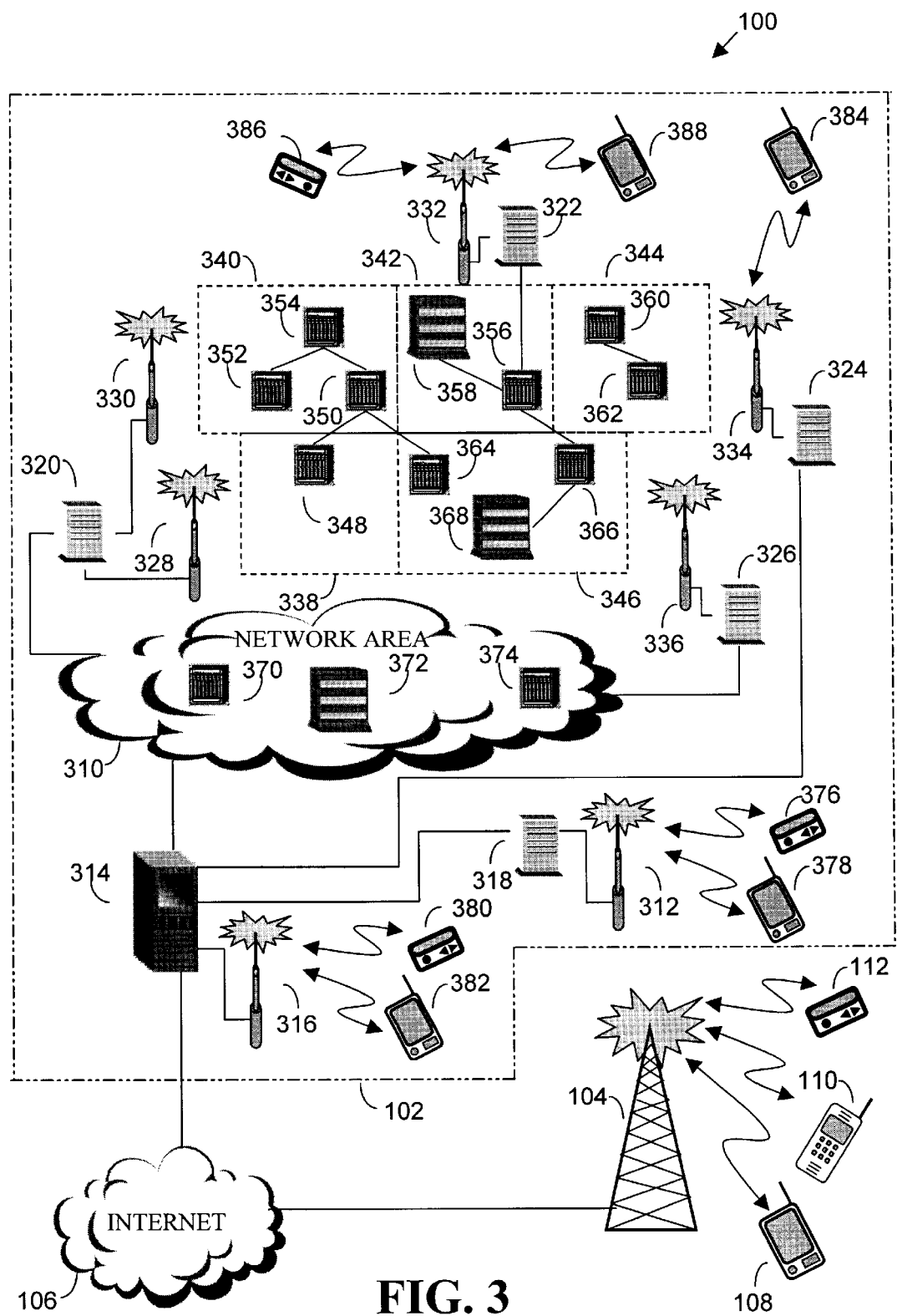
FIG. 3 is a diagram illustrating an expanded exemplary perspective of the structure of the exemplary distributed communications system of FIG. 1.

Referring now to FIG. 3, it is a diagram illustrating an expanded exemplary perspective of the structure of the exemplary distributed communications system 100 of FIG. 1. In FIG. 1, the system 100 is illustrated from a wireless personal area networking perspective as well as from a remote networking perspective. The system 100 includes the enterprise 102 that connects to the wireless service provider 104 via the internet 106. The enterprise 102 includes a network that further includes a distributed system of network management servers (NMS) that provide management capability for the enterprise 102 network. The distributed system of NMS includes a central NMS 314. Although in FIG. 3 the central NMS 314 for the enterprise 102 site is located at the enterprise 102 site, the system 100 is not limited to having the central NMS 314 located at the enterprise 102 site. For example, in other embodiments, the central NMS 314 may be located at a location, such as a distributor or service provider site, remote from the enterprise 102 site and may communicate remotely but preferably securely with the enterprise 102 network (see FIG. 6, for example). In such embodiments, the distributor or service provider preferably has been granted appropriate authorization and management responsibilities and privileges for at least a portion of the enterprise 102 network.

The mobile wireless capable devices 108, 110, 112 at remote locations accessible to the wireless service provider 104 communicate with the central NMS 314, preferably over a secure connection, via the wireless service provider 104 and the internet 106. The mobile wireless capable devices 108, 110, 112 form a portion of a wide area network (WAN) and the connection via the wireless service provider constitutes a WAN link. The mobile wireless capable devices 108, 110, 112 include the personal digital assistant (PDA) 108, the wireless application protocol (WAP) capable cellular phone 110, and the pager 112. The system 100 is not limited to these specific devices, however, and any of a variety of suitable mobile wireless capable devices may be used as suitable.

The enterprise 102 network includes a network area 310, the distributed system of NMS, personal area networks (PANs) 338, 340, 342, 344, 346, and wireless transceivers 312, 316, 328, 330, 332, 334, 336. The wireless transceivers 328, 330, 332, 334, 336 serve the respective subnetwork PANs 338, 340, 342, 344, 346. The distributed system of NMS includes the central NMS 314 and local NMS 318, 320,322,324,326. The network area 310 broadly represents a network, for example a wired network, which connects the central NMS 314 to the local NMS 320, 326. The central NMS 314 allows the distributed system of local NMS 318, 320, 322, 324, 326 to communicate and to share data with one another. Although the distributed system of local NMS 318, 320, 322, 324, 326 in FIG. 3 includes five local NMS under the oversight of the central NMS 314, any number of local NMS may used as suitable. Similarly, although five PANs 338, 340, 342, 344, 346 are illustrated in FIG. 3, any number of PANs, including PANs that overlap in terms of the network assets that belong to the PANs may be used as suitable.

Preferably, the wireless transceiver 312, 316, 328, 330, 332, 334, 336 are capable of transmitting and receiving communication signals at a variety of frequencies, including RF signals, Infrared signals, other signals as suitable, and combinations thereof. The type of signals transmitted or received will depend on the technology most suitable for deployment in a particular application. The signals carry the data for the system 100.

Preferably, a network manager deploys the distributed system of NMS, including the central NMS 314 and local NMS 318, 320, 322, 324, 326, to configure, manage, and monitor the enterprise 102 network. For example, the central NMS 314 and local NMS 318, 320, 322, 324, 326 may be OPTIVITY Network Management Systems, from Nortel Networks to manage network assets such as, for example, data routers, data switches, telecom switches as well as assets capable of supporting the SNMP, a telnet interface, an http management interface, or any other suitable protocol interface. Other possible management servers from Nortel Networks include the OPTIVITY Network Configuration System and the OPTIVITY Telephony Manager Server, although any suitable network management servers may be used. Preferably, the distributed system of NMS 314, 318, 320, 322, 324, 326, is responsible for collecting real-time information of the network assets being monitored and managed.

The network area 310 of FIG. 3 includes an exemplary set of network assets, such as hubs 370, 374 and a private branch exchange (PBX) 372 that are shown as distinct network assets but may be physically connected to each other or connected by wireless connections as suitable. Similarly, the PANs 338, 340, 342, 344, 346 together include network assets, such as hubs 348, 350, 352, 354, 356, 360, 362, 364, 366 and PBXs 358, 368, that in some cases are wired to each other within and across PAN boundaries. The system 100 is not limited to these specific devices, however, and any of a wide variety of suitable network assets can be managed by the system 100 and the embodiments described herein and may be used as suitable. The hubs 348, 350, 352, 354, 356, 360, 362, 364, 366, 370, 374 of FIG. 3 can be, for example, Bay Stack Hubs or Passport Switches from Nortel Networks, although any network devices may be used as suitable. The PBXs 358, 368, 372 of FIG. 3 can be, for example, MERIDIAN 1 systems from Nortel Networks, although any exchanges may be used as suitable. The individual PANs 338, 340, 342, 344, 346 themselves each include one or more of the network assets.

The central NMS 314 communicates with the local NMS 318 via a physical connection. The local NMS 318 is coupled to the wireless transceiver 312. Preferably, the local NMS 318 communicates with, and provides network management capability over, network assets in the enterprise 102 network via the wireless transceiver 312 coupled to the local NMS 313. Mobile wireless capable devices 376, 378 at the enterprise 102 site communicate with the local NMS 318 via the wireless transceiver 312 coupled to the local NMS 318. The mobile wireless capable devices 376, 378 as illustrated in FIG. 3 include a pager 376 and a PDA 378, although any of a variety of mobile wireless capable devices may be used as suitable. The mobile wireless capable devices 376, 378 communicate with the local NMS 318 and are preferably provided with management capability over assets on the enterprise 102 network. These assets may include network assets in a PAN, for example a wireless PAN, or any combination of network assets as suitable.

The central NMS 314 is coupled to the wireless transceiver 316. If the central NMS 314 is located at the enterprise 102 site, the central NMS 314 is capable of communicating with, and providing network management capability over, network assets in the enterprise 102 network via the wireless transceiver 316 coupled to the central NMS 314. Similarly, if the central NMS 314 is located at the enterprise 102 site, mobile wireless capable devices 380, 382 at the enterprise 102 site can communicate with the central NMS 314 via the wireless transceiver 316 coupled to the local NMS 318. The mobile wireless capable devices 380, 382 as illustrated in FIG. 3 include a pager 380 and a PDA 382, although any of a variety of mobile wireless capable devices may be used as suitable. The mobile wireless capable devices 380, 382 can communicate with the central NMS 314 and are in this instance preferably provided with management capability over assets on the enterprise 102 network. These assets may include network assets in a PAN, for example a wireless PAN, or any combination of network assets as suitable.

A network manager can deploy the distributed system of NMS 314, 318, 320, 322, 324, 326 and the wireless transceivers 312, 316, 328, 330, 332, 334, 336 in a variety of ways. For example, the central NMS 314 can connect to the local NMS. In other embodiments, the central NMS 314 can connect to the various wireless PANs directly. As another example, a local NMS, such as local NMS 322, can exist by itself interconnecting to other systems. Several of these possibilities, though not an exhaustive collection of all possibilities, have been depicted in FIG. 3.

Preferably, a local NMS may communicate with, and may provide network management capability over, one PAN or multiple PANs as desired in a particular implementation. The distributed system portion of local NMS 320, 322, 324, 326 that serves the PANs 338, 340, 342, 344, 346 in FIG. 3 is illustrative of some of the central NMS-local NMS-PAN arrangements that may exist. In a first arrangement, the local NMS provides management capability over two PANs via a wireless connection. The central NMS 314 communicates with the local NMS 320 via the network area 310. The local NMS 320 is coupled to the wireless transceivers 328, 330. The local NMS 320 communicates with, and provides network management capability over, the PAN 338 via the wireless transceiver 328 coupled to the local NMS 320. The PAN 338 includes one managed network asset, the hub 348. The local NMS 320 communicates with, and provides network management capability over, the PAN 340 via the wireless transceiver 330 coupled to the local NMS 320. The PAN 340 includes three managed network assets, the hubs 350, 352, 354. The hub 348 is physically connected to the hub 350, and although the hubs 348, 350 are managed by the local NMS 320, the hubs 348, 350 are members of separate PANs with the hub 348 a member of the PAN 338 and the hub 350 a member of the PAN 340.

In a second arrangement, the local NMS provides management capability over a single PAN via a physical connection, and connects to the central NMS via a wireless connection and an intermediate local NMS. The central NMS 314 preferably communicates with the local NMS 322 via, for example, the local NMS 324, the wireless transceiver 334 coupled to the Local NMS 324, and finally the wireless transceiver 332 coupled to the local NMS 322. The local NMS 322 communicates with, and provides network management capability over, the PAN 342 via a physical connection to the hub 356. The PAN 342 includes two managed network assets, the hub 356 and the PBX 358. It should be understood that in other embodiments, the local NMS 324 interfaces with other systems and oversees other local NMS without being connected to, or without communicating with, the central NMS 314. Mobile wireless capable devices 386, 388 at the enterprise 102 site communicate with the local NMS 322 via the wireless transceiver 332 coupled to the local NMS 322. The mobile wireless capable devices 386, 388 as illustrated in FIG. 3 include a pager 386 and a PDA 388, although any of a variety of mobile wireless capable devices may be used as suitable. The mobile wireless capable devices 386, 388 communicate with the local NMS 322 and are preferably provided with management capability over the network assets 356, 358 of the PAN 342.

In a third arrangement, the local NMS provides management capability over a single PAN via a wireless connection, but directly connects to the central NMS via a physical connection. The central NMS 314 communicates with the local NMS 324 via a physical connection. The local NMS 324 is coupled to the wireless transceiver 334. The local NMS 324 communicates with, and provides network management capability over, the PAN 344 via the wireless transceiver 334 coupled to the local NMS 324. The PAN 344 includes two managed network assets, the hubs 360, 362. A mobile wireless capable device 384 at the enterprise 102 site communicates with the local NMS 324 via the wireless transceiver 334 coupled to the local NMS 324. The mobile wireless capable device 384 as illustrated in FIG. 3 includes a PDA 384, although any of a variety of mobile wireless capable devices may be used as suitable. The mobile wireless capable device 384 communicates with the local NMS 324 and is preferably provided with management capability over the network assets 360, 362 of the PAN 344.

In a fourth arrangement, the local NMS provides management capability over a single PAN via a wireless connection. The central NMS 314 communicates with the local NMS 326 via the network area 310. The local NMS 326 is coupled to the wireless transceiver 336. The local NMS 326 communicates with, and provides network management capability over, the PAN 346 via the wireless transceiver 336 coupled to the local NMS 326. The PAN 346 includes three managed network assets, the hubs 364, 366 and the PBX 368. The hub 364 is physically connected to the hub 350, although the hub 364 is a member of the PAN 346 and is managed by the local NMS 326, and the hub 350 is a member of the PAN 340 and is managed by the local NMS 320. The hub 366 is physically connected to the hub 356, although the hub 366 is a member of the PAN 346 and is managed by the local NMS 326, and the hub 356 is a member of the PAN 342 and is managed by the local NMS 322.

As can be seen in FIG. 3 and as is known to those skilled in the art, a network may be divided into geographical regions where network assets fall in these regions. In FIG. 3, part of the enterprise 102 network is logically divided to represent distinct physical areas for the purposes of defining the wireless PANs 338, 340, 342, 344, 346. For example, the geographical boundaries of PANs can correspond to the buildings in a large campus. That is, a large campus network can be subdivided into a series of PANs, with each PAN corresponding to a separate building. In FIG. 3, the particular PANs 338, 340, 342, 344, 346 are served by the respective wireless communication equipment, the wireless transceivers 328, 330, 332, 334, 336, coupled to the local NMS 320, 322, 324, 326. A roaming network manager within the area of a PAN can connect to the PAN, such as the PAN 344, using a mobile wireless capable device, such as the PDA 384. Preferably, the roaming network manager obtains appropriate and relevant network views of the network assets of the PAN according to the technician's presence in the PAN area served by the local NMS and the wireless transceiver coupled to the local NMS.

The PAN 338, 340, 342, 344, 346 implementations are not limited to a particular wireless technology, for example Bluetooth, used to provide access and communication for the mobile wireless capable devices to the local NMS 320, 322, 324, 326. The media used to establish communication of the mobile wireless capable devices with the local and the central NMS may vary as suitable depending on the technologies used. Wireless media have been used in FIG. 3 as an illustrative example due in part to the ease of setting up a mobile wireless management solution using wireless technology according the systems and embodiments presented herein.

The central NMS 314 preferably supports value added region management. Sub-networks or subset network region within the enterprise 102 network may be defined. In a preferred embodiments, these sub-networks correspond to physical regions of the enterprise 102 network. The central NMS 314 preferably maps NMS capabilities to the network region, such as a PAN. The NMS capabilities preferably include specifically defined management applications that are integrated into a generic NMS. This may be accomplished by mapping NMS capabilities to a local NMS at the network region. Preferably, the central NMS 314 is capable of pinpointing the location of a mobile wireless capable device and thus the location of the user, or the network manager, operating the device. The central NMS 314 preferably maps the location of the network manager and the mobile wireless capable device to the network region, such as the PAN. This may be accomplished by mapping the network manager and mobile wireless capable device location to the local NMS at the network region.

Once the NMS capabilities and the network manager and mobile wireless capable device location have been mapped to the local NMS, the local NMS preferably translates NMS capabilities and management station functionality to the client mobile wireless capable device according to any of a variety of suitable protocols known to those skilled in the art. The central NMS 314 and the distributed system of NMS preferably support multiple levels of client mobile wireless capable device technologies. For example, the management functions available to a particular client mobile wireless capable device will vary according to the type of device. For example, a PDA client device might represent a fully functional device in terms of management capabilities, while a WAP-enabled cellular phone might represent a somewhat less functional device, and a wireless pager device might represent an even less functional device in terms of management capabilities. Of course, this attribute should be viewed as flexibility on the part of the distributed system of NMS to adjust to practically any level of technology inherent in the mobile wireless capable device and not as a limitation of any particular type of mobile wire capable device. In a preferred embodiment, a mobile wireless capable device such as a PDA client device can include a navigator to aid the network manager in selecting network management applications. As a default, the PDA client preferably is configured to bring up the physical area of interest, for example a PAN view, automatically. The PDA client preferably includes the capability to message with other PDA clients, preferably in a secure manner and preferably conditional on security privileges granted to the participating PDA client users, i.e. so that the security privileges affect the ability of a network manager to send or receive messages pertaining to certain views or other data. The PDA client preferably includes the capability to be aware of what other users are on-line with respect to one or various NMS, with respect to other mobile wireless capable devices, or with respect to certain managed network assets or network assets based on network topology views. Preferably, the PDA client includes the capability to navigate between management regions of the network irrespective of the confines of the immediate physical network. Of course, it should be understood that while a PDA represents an example of a potentially fully functional mobile wireless capable device any of a variety of mobile wireless capable devices may incorporate one or more of the features described above as suitable.

Figure 4:
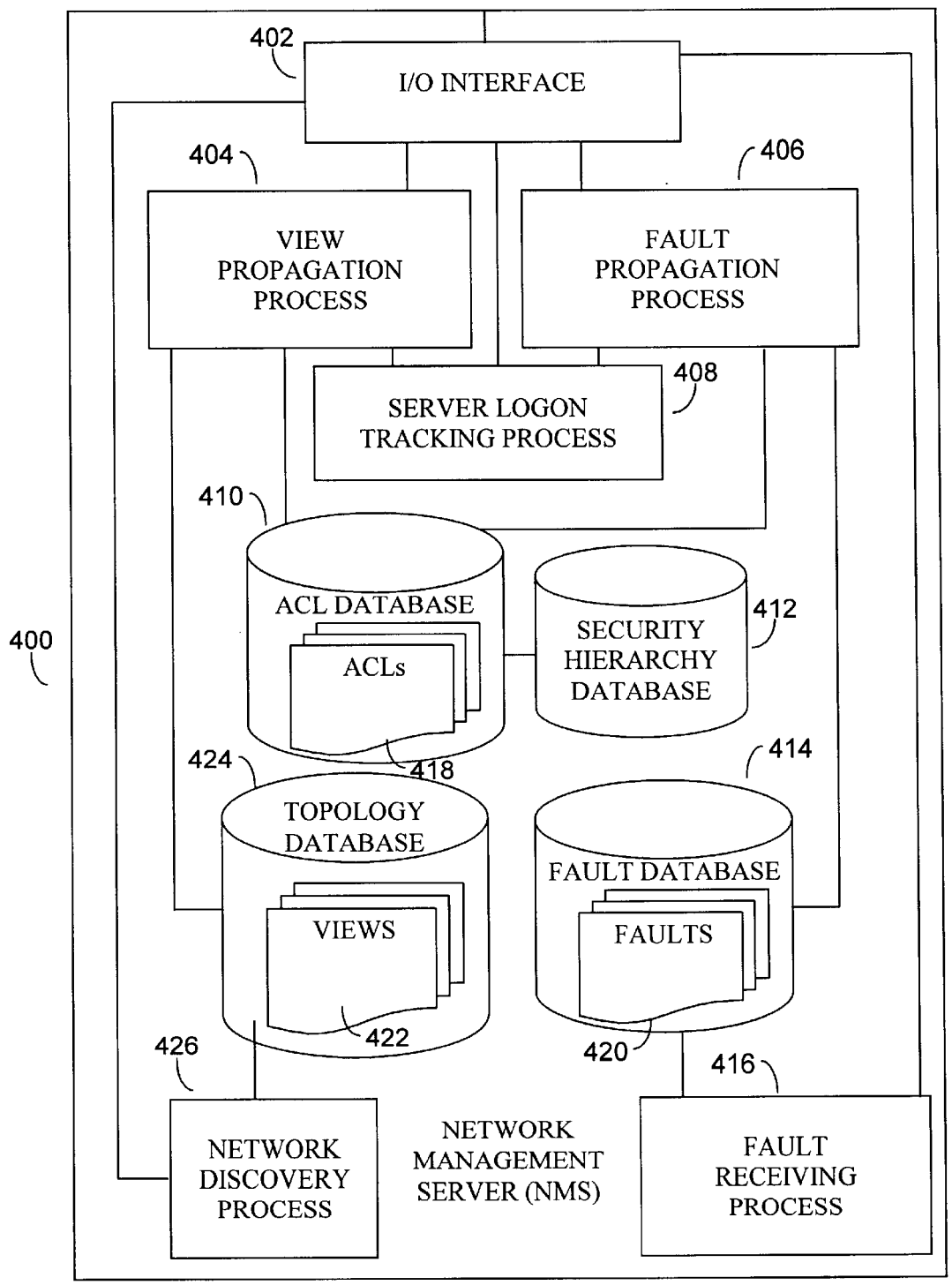
FIG. 4 is a diagram illustrating an exemplary embodiment of a network management server according to the exemplary distributed communications systems of FIGS. 1–3.

Referring now to FIG. 4, it is a diagram illustrating an exemplary embodiment of a network management server (NMS) 400 according to the exemplary distributed communications systems 100, 200 of FIGS. 1–3. The exemplary NMS 400 represents a generic NMS, such as the NMS 114 of FIG. 1, or the NMS 214 of FIG. 2. Preferably, the exemplary NMS 400 represents both a central NMS, such as the central NMS 314 of FIG. 3 and FIG. 5 below, and a local NMS, such as the local NMS 318, 320, 322, 324, 326 of FIG. 3 and the NMS 514, 534 of FIG. 5 below. Preferably, the local NMS are fully capable NMS with all the functionality of the central NMS. This capability allows for a distributed system of NMS so that a network management task is preferably either handled by a local NMS or the network management task is propagated on to the central NMS. Of course, it should be understood that the NMS 400 is one example of an NMS and other network management server arrangements and functions may be used. For example, the NMS 400 may be an OPTIVITY Network Management System from Nortel Networks. Other possible management servers from Nortel Networks include the OPTIVITY Network Configuration System and the OPTIVITY Telephony Manager Server, although any suitable network management servers may be used.

The exemplary NMS 400 includes an I/O interface 402, a view propagation process 404, a fault propagation process 406, a server logon tracking process 408, an access control list (ACL) database 410 to store access control lists (ACLs) 418, a security hierarchy database 412, a fault database 414 to store network faults 420, a fault receiving process 416, a view database 424 to store network topology and associated network topology views 422, and a network discovery process 426. The I/O interface 402 represents an input and output interface of the NMS 400. The I/O interface 402 is preferably wireless capable and can form a variety of wireless and wired connections with other entities. For example, preferably the I/O interface 402 is capable of connecting to the internet 106. The I/O interface 402 of the generic exemplary NMS 400 preferably communicates with network assets, other NMS, and mobile wireless capable devices. The I/O interface 402 may connect to a wireless transceiver to communicate with network assets, other NMS, and mobile wireless capable devices. In other embodiments, a wireless transceiver may be physically included as part of the I/O interface 402. In a preferred embodiment, the I/O interface 402 includes a network interface card.

The NMS 400 preferably performs a network discovery function, view propagation function, and fault propagation function. The view propagation and fault propagation functions are dependent on security access and hierarchy information maintained by the NMS 400. An NMS, for example, a local NMS serving a particular PAN is preferably the primary repository and access point for all network management data and applications pertaining to the PAN. For example, the local NMS preferably maintains the discovery, view, fault, and security access information, and the various management applications used to configure and manage the network assets of the PAN. In addition to providing essential network management capabilities (e.g. those which can be broadly categorized as fault, configuration, accounting, performance and security management), the local NMS is preferably designed to support remote roaming network technicians through the implementation of network topology view propagation and fault propagation as discussed below.

The network, or the portion of the network, being managed by the NMS 400, such as the enterprise 102 network, is preferably managed as a whole and, the links between network devices preferably constitute network assets as well. Network topology views, security permissions, fault management, and configuration applications relevant to a managed network asset such as a link behave as if for any other managed network asset such as a network device. Preferably, the logical division of the enterprise network to represent distinct physical areas also affects the links in the network topology views for the PAN. That is, the links will preferably be included as part of the network topology views.

Groups of NMS 400 preferably use a distributed architecture as described above and illustrated, for example, in FIG. 3. Generally, there may be a number of interconnected NMS that manage the distinct physical areas of a network. At the same time, however, these NMS preferably can communicate with each other to share data that enables a remote network manager, such as a roaming technician or a network administrator, to connect to one NMS and be able to get appropriate information on a network asset that is effectively being managed by a separate, remote NMS on the network. It should be understood that the NMS of a distributed system of NMS may themselves be connected together via wireless links.

The NMS 400 may also be connected to a wide area wireless service provider such as service provider 104 to create a WAN link in order to propagate fault and topology information to, for example, a remote network technician not within the reach of a PAN wireless transceiver. Preferably, the amount and security context of information routed over the WAN link is configurable by a network administrator to prevent unauthorized reception or access.

The NMS 400 network discovery function is carried out by the network discovery process 426. The network discovery process 426 communicates with the network via the I/O interface 402 to browse the network to discover the existing network topology. The network topology preferably serves as a schematic or blueprint of the assets present on the network, and may include the NMS. The network discovery process 426 forwards the discovered network topology to the view database 424. The view database 424 stores the network topology as well as network topology views 422 associated with the network topology as described below. The view database 424 is a repository of network topology views 422, including PAN and WAN views of the network.

The NMS 400 view propagation function is carried out by the view propagation process 404 in conjunction with the server logon tracking process 408, the access control list database 410, and the security hierarchy database 412. The server logon tracking process 408 preferably keeps track of any mobile wireless capable devices connected to or communicating with the distributed system of NMS. The view propagation process 404 communicates with the network via the I/O interface 402 to manage network topology views 422 and to propagate particular views 422 throughout the distributed system of NMS, the network, and target mobile wireless capable devices as applicable. Preferably, an appropriate network topology view is presented to a network manager at a mobile wireless capable device.

The NMS 400 fault propagation function is carried out by the fault propagation process 406 in conjunction with the fault receiving process 416, the fault database 414, the server logon tracking process 408, the access control list database 410, and the security hierarchy database 412. The fault receiving process 416 communicates with the network via the I/O interface 402 to receive faults associated with managed network assets, preferably directly from the managed network assets. The fault receiving process 416 forwards any received faults 420 to the fault database 414, which stores the faults 420. The fault propagation process 406 communicates with the network via the I/O interface 402 to propagate particular faults 420 throughout the distributed system of NMS, the network, and target mobile wireless capable devices as applicable. Preferably, an appropriate fault notification is presented to a network manager at a mobile wireless capable device in accordance with a tracked security, interest and location of the administrator. For example, fault notification may be routed from one NMS serving one PAN to another NMS serving another PAN because the network manager is in that PAN and is interested in the faults occurring in the first PAN. Further, if the network manager is in a WAN, the fault notification may be routed appropriately. Additionally or alternatively, faults that may be relevant to the network manager (in accordance with forwarding preferences set up for the manager based on severity, for example), may be forwarded in one PAN but not another.

The Network Discovery Process

Network management applications typically are structured according to a manager-agent model. The agents reside in the network assets, which provide the management information base (MIB) objects. The MIB objects provide performance and configuration information for the asset. The MIB objects are preferably accessed via the Simple Network Management Protocol (SNMP).

The network discovery process 426 on the NMS 400 discovers the physical network consisting of network assets, including interconnected devices and links. In a preferred embodiment, the NMS 400 is an OPTIVITY Network Management System server, from Nortel Networks to manage network assets such as telecom switches as well as assets capable of supporting a telnet or an http management interface or any other suitable protocol interface. Other possible management servers from Nortel Networks include the OPTIVITY Network Configuration System and the OPTIVITY Telephony Manager Server, although any suitable network management server may be used. Generally, the process of discovery is dependent on the type of NMS that is used. For example, on the OPTIVITY Network Management System, the network discovery process includes the following main features:

Layer 3 (Network Layer) discovery of Internet Protocol (IP) devices with SNMP MIB-II support.

Discovery of associated subnetworks.

Layer 2 (Data Link Layer) discovery of devices based on the Bridge MIB.

Precise definition of a particular network area of interest based on a set of discovery filters.

Discovery based on a seed file. The seed file includes information regarding which devices, IP ranges, or specific IP addresses are to be discovered and which are not to be discovered.

Capability to plug-in network assets that cannot be discovered by other means.

Network Topology Information

The network discovery process 426 on the NMS 400 forwards the discovery information regarding network topology to the topology database 424 where the topology information is stored. A set of rules associated with the network topology information are stored in the topology database 424 on the NMS 400. The network topology information and associated rules are used to visualize the network topology by the NMS 400.

Views

Views are central to realizing the concept of PANs and remote mobile network management. The NMS 400 defines and uses views 422, which are created and applied on top of the topology information, to propagate appropriate network topology and security information for the remote network technician to monitor, view and manage the network assets of interest. The views 422 are built from information in topology database 424 on the NMS 400 before being propagated to the remote NMS or mobile device for visualization/rendering.

Generally, a view is a higher level of abstraction above the network topology information and the rules associated with the network topology information. The views are configurable by a network administrator to logically represent a set of network assets, such as physical devices, belonging to a distinct geographical area. The view so defined can, for example, constitute the basis for the creation of a PAN for mobile network management.

Views preferably are automatically created by specifying discovery segments and discovery criteria, such as, for example, in the seed files explained with respect to network discovery on the OPTIVITY Network Management System from Nortel Networks.

In a preferred embodiment, the view is defined to coincide with the usable range of wireless communication equipment, such as, for example, the range of a wireless transceiver used to serve a PAN. In a preferred embodiment, views are defined and used to propagate network information over a WAN link to a network technician.

Preferably, there can be only one NMS, for example the central NMS 314, that holds all the different views, or even the one view, as the case may be. That is, one NMS is preferably assigned responsibility for holding all of the views. The network manager, such as a network administrator or a roaming network technician, can connect to this NMS from a WAN link to gain access to the managed network assets based on the views and associated security definitions. Similarly, fault notifications can be sent over a WAN link to a network technician's mobile wireless capable devices at a remote location.

Security Hierarchy Database

A network manager's position in the security hierarchy is preferably used to determine the manager's privileges and access permissions to assets on a network. For example, a network administrator for a company preferably has access to monitor, view and manage the entire network. These same permissions translate to the access rights the administrator receives when the administrator is remotely connected through a wireless device.

The actual security hierarchy information is dependent on the security policy defined by the administrator of that network. The security hierarchy information is preferably stored in the security hierarchy database 412. In some instances, the actual security hierarchy will largely reflect an organizational hierarchy of the company, but the degree to which these hierarchies coincide will preferably depend on the security policies in place.

In its simplest form this security hierarchy information can be locally available through the account information stored in the operating system of the NMS 400. In some smaller networked systems, the security rights and user privilege levels defined for network managers on the local operating system may be used by the NMS 400 to map to the access rights to the network assets being managed.

Preferably, the NMS 400 is capable of synchronizing the security hierarchy database 412 with an externally available security information provider entity such as a domain controller or a Lightweight Directory Access Protocol (LDAP) server. In this manner the hierarchy and security information is preferably controlled in a central location, typically in accordance with policies sets by the company's Human Resources and Information Services departments respectively, and is preferably propagated and translated into network management access permissions by the NMS 400.

Access Control Lists

The access control list database 410 is connected to the security hierarchy database 412 and stores access control lists (ACLs) 418 on the exemplary NMS 400. Access control lists (ACLs) 418 are created on the NMS 400 to translate security hierarchy policies into access privileges and permissions for specific network assets such as devices and links between devices. Preferably, every asset that is catalogued in some respect the view database 424 on the NMS 400 is assigned a corresponding ACL 418. Preferably, each network topology view defined on the NMS 400 is assigned a corresponding ACL 418.

As mentioned earlier, views are defined for the purpose of dividing the physical network into manageable areas. This may be done to achieve fine levels of control and security and to define areas of interest for the purpose of remote network management. Each view preferably consists of a set of network assets.

By way of analogy, the view can be thought of as a container that holds specific objects to expose the functionality of the objects and the access to the objects. Thus by defining the scope of the container and by controlling access to the container, the administrator limits access to the objects held in the container. Similarly, by defining the scope of the view and by controlling access to the view, the administrator limits access to the network assets that belong to the view.

For purposes of security, the view is preferably the parent of all the assets included within. That is, the network assets included within a view preferably inherit the security permissions of the view, i.e., the parent, however none can have the security permissions exceeding that of the parent.

For example, a view containing three network assets 370, 372, 374 can have "read" permissions for a network technician Mr. Joe and "read & write" permissions for a network technician Ms. Jane. So by default the assets will have "read" permissions when Mr. Joe accesses the view and the assets will exhibit "read & write" permissions when Ms. Jane accesses the view.

Using the ACLs 418 the administrator can introduce finer levels of control over access permissions for each of the assets within the view. Note that an asset can belong to multiple views, and, depending on the view that the network manager has access to, the asset will exhibit different access rights and permissions. In some views, the network asset may not be visible at all.

Based on all this information, the view is created for the network manager, and, subject to access control, the view is propagated to the network manager's mobile wireless capable device.

As explained earlier, a network topology view 422 is created based on the topology information, security access rights and the logical demarcation of the network to be managed. A view may represent a number of different network topologies. For example, a view may represent a PAN served by a wireless transceiver and managed by an NMS 400. As another example, a view may be represent the logical division of a network into manageable segments. As an additional example, a global view may be defined by a network administrator that is accessible to the administrator from all locations at all times.

The view system is entirely configurable to represent any divisions or sub divisions of the network for the purposes of remote network management, using wireless technology for PAN or established wireless service providers such as provider 104 for the WAN.

The views 422 generated are preferably kept in persistent storage in the view database 424 on the NMS 400. Preferably, the storage organization of the database 424 conforms to security and access permissions applicable on the system and the views 422.

The View Propagation Process

The remote network can be managed by a distributed system of NMS where each sub-network of the network represents a view. There can be multiple views defined per NMS for a sub-network that is controlled by the NMS. Similarly an entire network can be divided into a set of views and be managed by one single NMS. In this instance, in a PAN environment, the one NMS may connect to multiple wireless transceivers to serve the PANs. In a remote WAN environment, the one NMS, for example, may connect to the wireless service providers 104 to make the views available over the WAN.

In a distributed system of NMS, the NMS 400 communicate with each other to exchange and propagate in a secure manner the view definitions existing on the respective NMS 400. The rules for exchange and propagation of views are defined by the view propagation processes 404 on the respective NMS 400.

The view propagation process 404 obtains information from any connected NMS 400 and holds the information in the internal tables of the view propagation process 404 to determine what views should be propagated and to which NMS the views should be propagated. Preferably, there can be only one NMS, for example the central NMS 314, managing the views and view propagation for the distributed system of NMS. In that case the task of the view propagation process 404 is to propagate the view information to the remote mobile wireless capable device.

View Propagation in PANs

When the network manager comes within range of a PAN that is controlled by a view defined on the NMS 400, the network manager is granted access to the view of the network on the network manager's mobile wireless capable device based on the security permissions of the network manager. The wireless transceiver coupled to the NMS 400 and the view propagation process 404 on the NMS 400 periodically exchange information to determine the presence of mobile wireless capable devices in the range of the PAN.

If the network manager inside the PAN 340 also has access to views defined in the PANs 342, 344, then the network manager is able to access those views from within this area as well. This is achieved by the view propagation processes 404 of the distributed system of NMS connecting over a LAN or a WAN propagating the appropriate views to the target NMS which generates the final application system at the mobile wireless capable device.

View Propagation Over the WAN

Preferably, when a network manager is present in a WAN remote location served by, for example, the wireless service provider 104, the network manager can still monitor views and configure the network of interest using the manager's mobile wireless capable device, for example, the PDA 108 or the WAP-capable cellular phone 110.

The NMS at the enterprise 102 site connects to the WAN wireless service provider 104. The remote network manager connects via the wireless service provider 104 network to the NMS. Based on the manager's view preferences and security permissions, the appropriate access to network views and applications is propagated through the distributed system of NMS to, for example, a gateway of the wireless service provider 104 for onward propagation to the manager's mobile wireless capable device.

Network Manager Access To Views

A network manager is preferably not limited to accessing the network views and running the management applications to manage network assets present only in an immediate covered geographical area. By virtue of view propagation, whether through a distributed system of NMS or through a system managed by one central NMS 314, the network manager is preferably presented with a global picture of the network, and more particularly of the network views to which the manager has access, at any supported location and at any time.

Views Generated Upon Fault Notifications

Preferably, the network manager receives notification of a network fault 420 on a mobile wireless capable device. Preferably coincident with the fault notification, the appropriate network topology view 422 is preferably generated for the remote network asset in order that the network manager can monitor, control and manage the device in the appropriate remote network from the mobile wireless capable device.

Fault Receiving Process

The fault receiving process 416 on the NMS 400 receives any faults 420 generated by assets on the managed network. These faults can be, for example, SNMP traps to send faults in response to certain network events, or even streams of faults sent by managed network assets to the NMS 400. Faults may be raised, for example, as part of performance thresholds being exceeded or on the occurrence of some error conditions.

The fault 420 received is logged in the fault database 414 and made available for applications that need to access it later. An application such as an fault or alarm browser can read the fault database 414 on the NMS 400 to present the history of faults to the network manager at a later point in time.

Depending on the configuration of the system by which faults are managed, the faults 420 preferably are propagated via the fault propagation process 406 to a mobile wireless capable device to attract the urgent attention of the network manager. For example, a network administrator may want to receive a fault notification on mobile wireless capable device such as a pager or a cellular phone if a fault defined as critical occurs on, for example, a network Internet router or if a security violation is discovered on the network firewall.

More broadly, the mobile network management system preferably has the capability to remotely notify a network manager of network events of interest via the fault propagation process 406. The network event notification can be propagated over the distributed system of NMS to the exact location of the network manager present in a PAN or a WAN. Preferably, the network manager also receives a topology view of the network area that the fault occurred in, subject to the security access permissions of the network manager. The network manager preferably also receives faults for a particular view if the manager is in the area defined by the particular view and if the manager has access to the network assets within the view.

The Server Logon Tracking Process

The server logon tracking process 408 on the NMS 400 receives data from the distributed system of NMS to determine the location of the network manager in a PAN or a WAN. In its simplest form, the network manager can log on to the NMS 400 that serves the PAN or WAN and by doing so communicate to the NMS 400 that the manager is present in the PAN or the WAN area, as applicable. The information with respect to the presence of the manager is used by the fault propagation processes 406, as well as the view propagation processes 404, of the distributed system of NMS to route data to the mobile wireless capable device of the network manager.

Fault Propagation

The fault propagation process 406 is preferably configured to raise fault notifications and propagate them to the appropriate mobile wireless capable device of a network manager based on the existence of certain error conditions on the managed network assets.

Based on the information provided by the views 422, the ACLs 418, and the server logon tracking process 408, the fault propagation process 406 propagates a fault 420 from the fault receiving process 416 to the appropriate NMS, and onward to the network manager with the mobile wireless capable device. In a preferred embodiment, as an intermediate step, the fault 420 may be sent as an electronic mail message from an e-mail system to the mobile wireless capable device.

The fault propagation process 406 preferably formats the fault information so that the information includes the information on the distributed system of NMS and the views that define the asset raising the fault. This fault information is then used by the target NMS that directly serves the remote mobile wireless capable device, whether locally or via a WAN link, to generate appropriate access views for management applications on the mobile wireless capable device to access, monitor and manage the network asset.

For example, a network manager receives a fault from a network asset in a remote network, for example, a PAN, on the enterprise 102 site. The target NMS that sends the fault notification to the mobile wireless capable device also preferably constructs a proper access view and a connection route for the network manager to connect to and manage the network asset or to browse the fault or alarm browser on the NMS, that is, the NMS that manages the remote network to which the asset belongs, to debug and troubleshoot the problem.

Fault Propagation In PANs

As explained with regard to view propagation, the fault propagation process 406 propagates the network faults 420 to the target mobile wireless capable device based on the information of the network manager present in the PAN.

When the network manager comes within range of a PAN, the network manager is granted access to any faults being sent by network assets of the PAN on the network manager's mobile wireless capable device based on the security permissions of the network manager. The wireless transceiver coupled to the NMS 400 and the fault propagation process 406 on the NMS 400 periodically exchange information to determine the presence of mobile wireless capable devices in the range of the PAN.

If the network manager inside the PAN 340 also has access to faults from network assets in the PANs 342, 344, then the network manager is able to access those faults from within this area as well. This is achieved by the fault propagation processes 406 of the distributed system of NMS connecting over a LAN or a WAN propagating the appropriate faults and fault notifications to the target NMS which generates the final application system for the network technician at the mobile wireless capable device.

Fault Propagation Over the WAN

Faults preferably are propagated to the appropriate mobile wireless capable device over the WAN using conventional physical connects or wireless links, as defined in the fault propagation process 406. For example, in its simplest form, the fault propagation process 406 is preferably configured to forward a fault notification to a mobile wireless capable device such as a wireless pager device by a direct notification through, for example, the PSTN 246 cf FIG. 2 or via an e-mail notification.

The fault propagation process 406 in the exemplary NMS 400 preferably is configured to send notifications over the WAN if the mobile wireless capable device of the network manager for whom the fault is intended cannot be found in the PANs directly connected to the distributed system of NMS.

A fault notification received over the WAN link also preferably includes the complete view and routing information to enable the remote network manager to connect to the network, for example the PAN, or, more specifically, to the network asset that the manager seeks to manage.

Fault and View Propagation and Routing Connections

Management applications such as fault or alarm browsers can be used by the remote network manager to obtain more information about the network and the network assets after the network manager receives a fault notification. Preferably, the views and routing information generated by the distributed system of NMS automatically connect the network manager to the remote network asset without the network manager being concerned with routing issues such as connection points, IP addresses, and URLs. That is, the routing connection is preferably automatically configured without the intervention of the network manager.

Security

Preferably, all security restrictions defined on networks and assets and discussed with respect to views apply to the fault propagation process 406 as well. For example, a network manager who has been denied access to a network asset cannot receive fault notifications on that asset either. Similarly, a network manager may be allowed to receive fault notification on a network asset but not to run certain management applications on the asset.

As an example of network discovery, view propagation, and fault propagation with regard to FIG. 3, the distributed system of NMS, including the central NMS 314 and the local NMS 318, 320, 322, 324, 326 use their respective network discovery processes 426 to discover the enterprise 102 network topology consisting of network assets, preferably including interconnected devices and links. The network discovery processes 426 forward the network topology information to their respective view databases 422. A network administrator defines a view 422 on, for example, the central NMS 314 that represents the physical network of a building at the enterprise 102 site. The administrator creates an ACL 418 on the NMS 314 to translate security hierarchy policies of a network technician from the security hierarchy database 412 into access privileges and permissions for specific network assets. The view 422 is assigned a corresponding ACL 418. According to the example, the building includes the network assets 360, 362, and the administrator establishes the PAN 344 as a view 422 for the network technician based on the technician's place in the security hierarchy. The view 422 is propagated to and received by the NMS 324 according to the view propagation processes 404 running on the central NMS 314 and the NMS 324, respectively. In this way, the NMS 324 is capable of provide the view 422 to the mobile wireless capable device 384, here a PDA 384 belonging to the network technician. The network technician is granted access to the view 422 of the PAN 344 and the assets 360, 362 by communicating with the wireless transceiver 334 coupled to the NMS 324. Similarly, the network technician can receive, for example, any fault notifications originating from, or pertaining, to the network assets 360, 362 of the view 422 at the PDA 384 from the NMS 324. Any fault notifications are propagated to and received by the NMS 324 according to the fault propagation processes 406 running on the central NMS 314 and the NMS 324, respectively.

Figure 5:
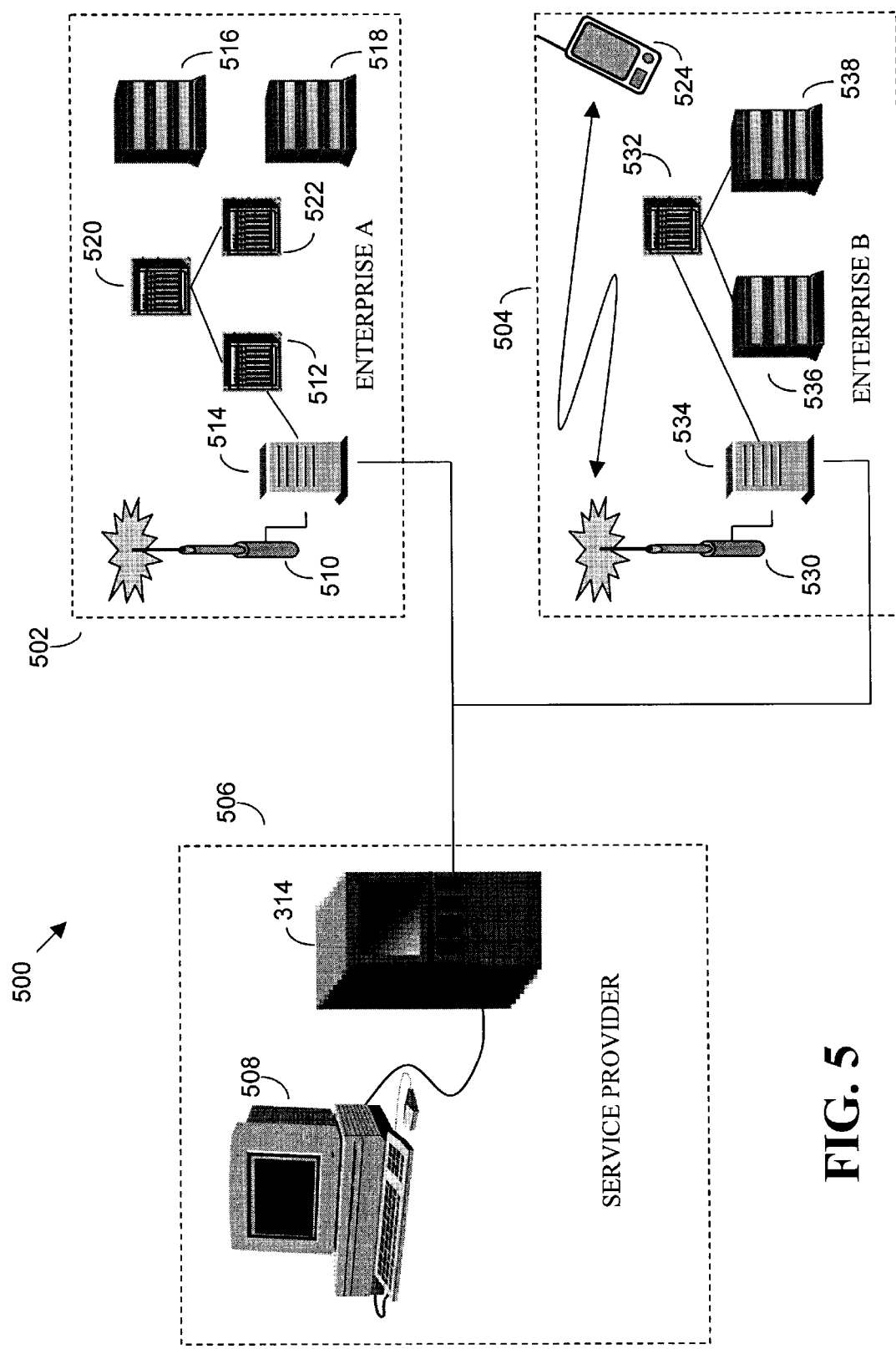
FIG. 5 is a diagram illustrating an exemplary network management arrangement between an exemplary service provider and two exemplary enterprises according to the exemplary distributed communications systems of FIGS. 1–3.

It should be understood that the particular functions of the exemplary NMS 400 as described above may be applied generally to any NMS, such as the NMS 114 of FIG. 1 and the NMS 514, 534 of FIG. 5, including a central NMS, such as the central NMS 314 of FIGS. 3 and 5, a local NMS, such as the local NMS 318, 320, 322, 324, 326 unless explicitly stated to the contrary or unless evident to one skilled in the art from the context of the description of the particular function or functions.

FIG. 5 is a diagram illustrating an exemplary network management arrangement 500 between an exemplary service provider 506 and two exemplary enterprises, enterprise A 502 and enterprise B 504, according to the exemplary distributed communications systems 100, 200 of FIG. 1. A network administrator at the service provider 506 site connects to the central NMS 314 via a computer 508. In this embodiment, the central NMS 314 is located at the service provider 506 site. The central NMS 314 communicates with and oversees an NMS 514 at the enterprise A 502 site and an NMS 534 at the enterprise B 504. The enterprise A 502 network includes the NMS 514, a wireless transceiver 510 coupled to the NMS 514, and network assets 512, 516, 518, 520, 522. The enterprise B 504 network includes the NMS 534, a wireless transceiver 530 coupled to the NMS 534, and network assets 532, 536, 538.

The network assets 512, 516, 518, 520, 522, 532, 536, 538 include hubs 512, 520, 522, 532 and private branch exchanges (PBXs) 516, 518, 536, 538. The network exemplary network management arrangement 500 is not limited to these specific devices, however, and any of a wide variety of suitable network assets can be managed by the management arrangement 500 and the embodiments described herein and may be used as suitable. The hubs 512, 520, 522, 532 of FIG. 1 can be, for example, Bay Stack Hubs or Passport Switches from Nortel Networks, although any network devices may be used as suitable. The PBXs 516, 518, 536, 538 of FIG. 1 can be, for example, MERIDIAN ONE systems from Nortel Networks, although any exchanges may be used as suitable.

A mobile wireless capable device 524 at the enterprise B 504 site communicates with the NMS 534 via the wireless transceiver 530. The wireless transceiver 530 may itself communicate with, for example, a wireless personal area network (PAN) at the enterprise B 504 site. The mobile wireless capable device 524 of FIG. 5 is illustrated as a PDA 524, although any mobile wireless capable device may be used as suitable. In an exemplary scenario, a network technician uses the mobile wireless capable device 524 to communicate with the NMS 114 and is the mobile wireless capable device 524 is preferably provided with management capability over assets on the enterprise B 504 network, dependent on the security privileges of the network technician. These assets may include, for example, the network assets 532, 536, 538, network assets in a PAN, for example a wireless PAN, or any combination of network assets as suitable.

In an exemplary scenario, the network administrator at the computer 508 defines security privileges for the network technician that include access to network topology views of network assets 532, 536, 538 on the enterprise B 504 network. In this way, the administrator permits the network technician to manage a portion of the enterprise B 504 network in the event of a problem or other event that dictates that the network technician have management capability. The network technician is, for example, given the capability to troubleshoot the network assets 532, 536, 538 but not the capability to reconfigure the network assets 532, 536, 538. The network technician is, for example, permitted to manage the network assets 532, 536, 538 but is not allowed to manage other network assets on the enterprise B 504 site, for example, network assets that are located in a separate geographical area from the network assets 532, 536, 538. In this way, the network technician has geographical as well as management responsibility privilege levels.

Continuing with the exemplary scenario, assume that a problem arises with the enterprise B 504 network and the network administrator is able to isolate the source of the problem as deriving from the network assets 532, 536, 538. The network administrator, for example, dispatches the network technician to the geographical location of the network assets 532, 536, 538, for example, the building in which these assets 532, 536, 538 are located on the enterprise B 504 site. The mobile wireless capable device 524, in this case, the PDA 524 adapts to changing geographical areas as the roaming network technician steps into the network topology view defined by the administrator at the central NMS 314. That is, the roaming network technician automatically gets access to and information concerning the network assets 532, 536, 538 when the technician steps into the range of the network assets 532, 536, 538. The PDA 524 automatically contacts an NMS, preferably the nearest NMS, which for example in this instance is the NMS 534. The NMS 534 provides the PDA 524, and thus the network technician, with network views according to the network technician's geographical and responsibility privileges at the enterprise 504 site. In this case, this means that the technician is granted access to the network assets 532, 536, 538 and can troubleshoot, but not reconfigure, the assets 532, 536, 538.

The inclusion of the enterprise A 502 network in FIG. 5 is intended to illustrate that the central NMS 314 can be used to administer and define network management views on more than one enterprise network. Although two networks for enterprises A 502 and B 504, respectively, are illustrated in FIG. 5, a central NMS at a service provider or distributor site can provide oversight of generally any number of networks such as enterprise networks.

Although the presently preferred embodiments of the systems and methods presented herein focus on network management of network assets from a remote perspective an d from a local, personal area network perspective, it should be understood that network management of network assets with remote mobile wireless capable devices and network management of network assets with locally networked mobile wireless capable devices need not both be incorporated in the same system, depending on the application.

As used herein, the term mobile wireless capable device is intended broadly to refer to any of a variety of devices capable of communicating via wireless media with some degree of mobility. A mobile wireless capable device may be, for example, a handheld wireless device, a wireless terminal, a Wireless Application Protocol (WAP) capable device such a cellular or digital mobile phone, a pager, a personal digital assistant, or a cellular device equipped with a Web browser, or any combination of these elements and devices, although this list does not exhaust all types of possible devices. The mobile wireless capable device may be a Bluetooth compatible wireless device for use in a personal area network (PAN) environment. The particular device that is used as the mobile wireless capable device will in some cases depend on the application in which the mobile wireless capable device is utilized. In a fault monitoring context, in which, for example, a fault or alarm browser might be used to receive and view, listen, or be notified of faults occurring on the network, a pager or a WAP capable cellular phone would be useful. For PAN applications, a Bluetooth compatible wireless device would be useful. For a monitoring of a wide-area network as well as for PAN network management, a PDA would be useful. Those skilled in the art will understand that the term mobile wireless capable device broadly refers to a wide variety of devices and that these devices would be useful in a wide variety of applications. Of course, it should be understood that in some embodiments the wireless capable device is capable of being physically connected to a network.

As used herein, the term network management server is intended to refer broadly to a computing device such as a server that includes at least some degree of management capability over assets on a network. Preferably, a network manager deploys a network management server to configure, manage, and monitor a portion of a network, such as an enterprise network. An example of a network management server is the OPTIVITY Network Management System from Nortel Networks. Other possible management servers from Nortel Networks include the OPTIVITY Network Configuration System and the OPTIVITY Telephony Manager Server, although any suitable network management servers may be used.

The remote and local mobile network management systems described herein preferably map the functions and capabilities of existing network management servers to mobile wireless capable devices directly, or indirectly via intervening network environments. The functions and capabilities include a range of network management applications such as, for example, network topology discovery, visualization of network topology, and fault management. The remote and local mobile network management systems described herein enables a regular network management server to project its functionality beyond a fixed network. The remote and local mobile network management systems described herein preferably provide all of the functionality of network management systems to the mobile wireless capable devices with which the network management systems interface, subject to user privileges. In addition, the remote and local mobile network management systems described herein preferably create and implement new features tailored to mobile environments, including providing forwarding of fault notifications and access to applications based on geographical location and privileges. The network management server capabilities that generally relate to the operation of the remote and local mobile network management systems have been described. Any exemplary functions, and capabilities described herein in no way exhaust the existing and potential functions and capabilities of network management servers, all of which are preferably available from the remote and local management system. The remote and local mobile network management systems described herein present a way of accessing the information available on, and the applications associated with, a network management server.

As used herein, the term network assets is intended broadly to refer to any of a variety of diverse entities and resources on a network. A network asset may be, for example, a network device. A link between two or more network devices may also be a network asset. Similarly, a logical entity, such as a network service, rather than a physical entity, may also be a network asset. A network itself may be a network asset. Physical or virtual subnetworks of a network may be network assets, for example. Examples of a network assets include a router, such as a data router, a switch, such as a data switch or a telecommunication switch, a switch module, a hub, a bridge, a network interface card, a PBX, telecommunication devices, any device that supports the SNMP, any device that supports at least one of the standard MIB objects, any device that supports at least one of the standard MIB objects and supports the SNMP, and any devices capable of supporting a telnet or an http management interface or other suitable protocol interface. The network assets can themselves be wireless devices, for example a Wireless Ethernet Hub for a local area network (LAN). Similarly, the network being managed can itself be a wireless network, where the network assets are interconnected by wireless links. In a preferred embodiment, the network being managed is a cellular network. Those skilled in the art will understand that the term network asset broadly refers to a wide variety of devices, and links and that these devices and links would be useful in a wide variety of applications.

As used herein, the term network is intended broadly to refer to any of a variety of types of networks and network technologies. The network being managed can be, for example, a data communications network. For example, a network manager can administer computers on a LAN on a mobile wireless capable device. The network is not restricted to a data network. The network can be, for example, a wired network, a data network, voice network, an optical network, a wireless network, or a converged or heterogeneous networks that includes any combination of wired, wireless, optical, data, and voice). For example, a network manager from a distributor office can administer telecommunications equipment on a mobile wireless capable device. As another example, a network manager can manage and monitor an optical network on a mobile wireless capable device. As another example, a network manager can administer wireless network assets in a wireless network environment on a mobile wireless capable device. As another exemplary scenario, a distributor can manage and monitor cellular network assets, including the wireless transceivers used to serve cells in the network service area, on a cellular service providers network. A network manager from the distributor office can manage cellular equipment at the cellular service providers network on a mobile wireless capable device by connecting to a network management server on the network site via, for example, a wireless transceivers, such as the transceivers used to serve cells in the network service area.

Those skilled in the art will recognize that the underlying communication media and protocols used to achieve basic transmission of electronic signals is fundamentally important at a basic level but of little consequence to the description of the systems and methods presented herein. Of relevance to the systems and methods is using known and even heretofore unknown but suitable communication media, protocols, and techniques to achieve remote and/or local wireless monitoring, configuration, connection to, and management of network assets in, for example, real-time, as provided by the presently preferred embodiments and the systems and methods described herein.

Although the present invention has been particularly described with reference to the preferred embodiments, it should be readily apparent to those of ordinary skill in the art that changes and modifications in the form and details may be made without departing from the spirit and scope of the invention. It is intended that the appended claims include such changes and modifications.

What is claimed is:

1. A method of providing mobile network management of assets on a network, comprising:
   identifying a plurality of personal area networks within the network;
   providing a network management server to control a network asset on the network, the network asset connected to the network management server via a connection path;
   associating the network asset with a first one of the plurality of personal area networks;
   associating the first personal area network with a first network manager;
   establishing a communication path between the network management server and a mobile wireless capable device associated with the first network manager, and
   selectively allowing the first network manager to configure the network asset via the communication path with the mobile wireless capable device based on the association between the first network manager and the first personal area network.

2. The method of claim 1, wherein the connection path comprises a wireless connection.

3. The method of claim 1, wherein the connection path comprises a wired connection.

4. The method of claim 1, wherein the mobile wireless capable device is locally networked with the network management server.

5. The method of claim 1, wherein the communication path comprises:

a transceiver capable of wireless transmission and reception of information, the transceiver coupled to the network management server.

6. The method of claim 1, wherein the mobile wireless capable device is remotely networked with the network management server.

7. The method of claim 1, wherein the communication path comprises:

a remote transceiver capable of wireless reception and transmission of information, the transceiver capable of establishing a connection with the network management server via an internet.

8. The method of claim 1, wherein the mobile wireless capable device comprises a handheld computing device.

9. The method of claim 1, wherein the mobile wireless capable device comprises a mobile telephone device.

10. The method of claim 1, wherein the mobile wireless capable device comprises a pager device.

11. The method of claim 1, wherein the mobile wireless capable device comprises a personal digital assistant device.

12. The method of claim 1, wherein the mobile wireless capable device comprises a device capable of browsing the World Wide Web.

13. The method of claim 1, wherein the mobile wireless capable device comprises a device capable of viewing a network topology of the network.

14. The method of claim 1, wherein the mobile wireless capable device comprises a Wireless Application Protocol (WAP) compatible device.

15. The method of claim 1, wherein the network asset comprises a network device.

16. The method of claim 1, wherein the network asset comprises telephony equipment.

17. The method of claim 1, wherein the communication path comprises a secure communication path.

18. The method of claim 1, further comprising:

providing a network topology view to the first network manager via the mobile wireless capable device.

19. The method of claim 18, further comprising:

constructing the network topology view to be provided to the first network manager based on the first personal area network associated with the first network manager.

20. The method of claim 1, wherein the step of associating the first personal area network with the first network manager includes the step of determining a geographical location of the network manager.

21. The method of claim 20, wherein the determining step includes identifying a range of the personal area network and comparing the range to the geographical location.

22. The method of claim 1, further comprising:

associating another network asset with a second one of the plurality of personal area networks;

associating the second personal area network with the first network manager;

selectively allowing the first network manager to configure the another network asset via the communication path with the mobile wireless capable device based on the association between the first network manager and the second personal area network.

23. A mobile network management system, comprising:

a network management server to control a network asset;

a topology database coupled to the network management server that stores information concerning a plurality of personal area networks, the network asset being associated with a first one of the personal area networks, the network asset connected to the network management server via a connection path;

a wireless transceiver coupled to the network management server; and a mobile wireless capable device to communicate with the network management server via the wireless transceiver, the mobile wireless capable device being associated with the first personal area network, wherein the network management server constructs network topology views to be presented on the mobile wireless capable device in accordance with the information stored in the topology database.

24. The system of claim 23, wherein the network management server enables the network asset to be configured by the mobile wireless capable device via signals from the mobile wireless capable device conveyed by the wireless transceiver.

25. A mobile network management system, comprising:

a network management server to control a network asset;

a topology database coupled to the network management server that stores information concerning a plurality of personal area networks, the network asset being associated with a first one of the personal area networks, the network asset connected to the network management server via a connection path;

a remote wireless transceiver communicating with the network management server via an internet; and a mobile wireless capable device to communicate with the network management server via the remote wireless transceiver and the internet, the mobile wireless capable device being associated with the first personal area network, wherein the network management server constructs network topology views to be presented on the mobile wireless capable device in accordance with the information stored in the topology database.

* * * * *